United States Patent [19]

Bobeth et al.

[11] Patent Number: 4,457,817

[45] Date of Patent: Jul. 3, 1984

[54] METHOD OF TREATING HIGH-POLYMER MATERIALS

[75] Inventors: Wolfgang Bobeth; Adolf Heger, Helman Pässler, all of Dresden, German Democratic Rep.

[73] Assignee: Forschungs Institut für Textiltechnologie, German Democratic Rep.

[21] Appl. No.: 818,577

[22] Filed: Jul. 25, 1977

Related U.S. Application Data

[63] Continuation of Ser. No. 579,815, May 12, 1975, abandoned, which is a continuation of Ser. No. 397,248, Sep. 14, 1973, abandoned, which is a continuation-in-part of Ser. No. 76,070, Sep. 28, 1970, abandoned.

[51] Int. Cl.² ............... C08F 255/02; C08F 265/08; C08F 283/02
[52] U.S. Cl. ............ 204/159.15; 204/159.16; 204/159.19; 264/22; 264/25; 264/236; 264/342 R; 264/347
[58] Field of Search ............ 264/22, 25, 232, 236, 264/342 RE, 342 R, 347, DIG. 47; 204/159.15, 159.12, 159.16, 159.19, 159.2

[56] References Cited

U.S. PATENT DOCUMENTS

| | | | |
|---|---|---|---|
| 2,670,337 | 2/1954 | Toulmin, Jr. | 264/25 |
| 2,956,899 | 10/1960 | Cline | 264/22 |
| 3,078,544 | 2/1963 | Shealy | 28/82 |
| 3,107,206 | 10/1963 | Cottet et al. | 204/154 |
| 3,165,563 | 1/1965 | Rasmussen | 264/DIG. 47 |
| 3,201,336 | 8/1965 | Magat et al. | 204/154 |
| 3,281,263 | 10/1966 | Priesing et al. | 204/159.15 |
| 3,290,207 | 12/1966 | Magat et al. | 264/DIG. 47 |
| 3,674,591 | 7/1972 | Boyd, Jr. | 264/22 |

OTHER PUBLICATIONS

"A Guide to Radiation Equipment", Olander, *Plastics Engineering*, Jun. 1961, vol. 38, No. 10—pp. 105–106, 109, 110, 113, 116, 119, 190, 192, 197.

*Primary Examiner*—Jeffery R. Thurlow
*Attorney, Agent, or Firm*—Michael J. Striker

[57] ABSTRACT

The texture, structure and/or color of an exposed surface of a high-polymer material is influenced by subjecting localized areas of this exposed surface to the influence of a high-energy electron beam, and by treating the exposed surface before and/or during and/or after such exposure to the electron beam with a monomeric vinyl substance which grafts onto the locally irradiated areas so as to cause the latter to shrink relative to the remainder of the material.

7 Claims, 4 Drawing Figures

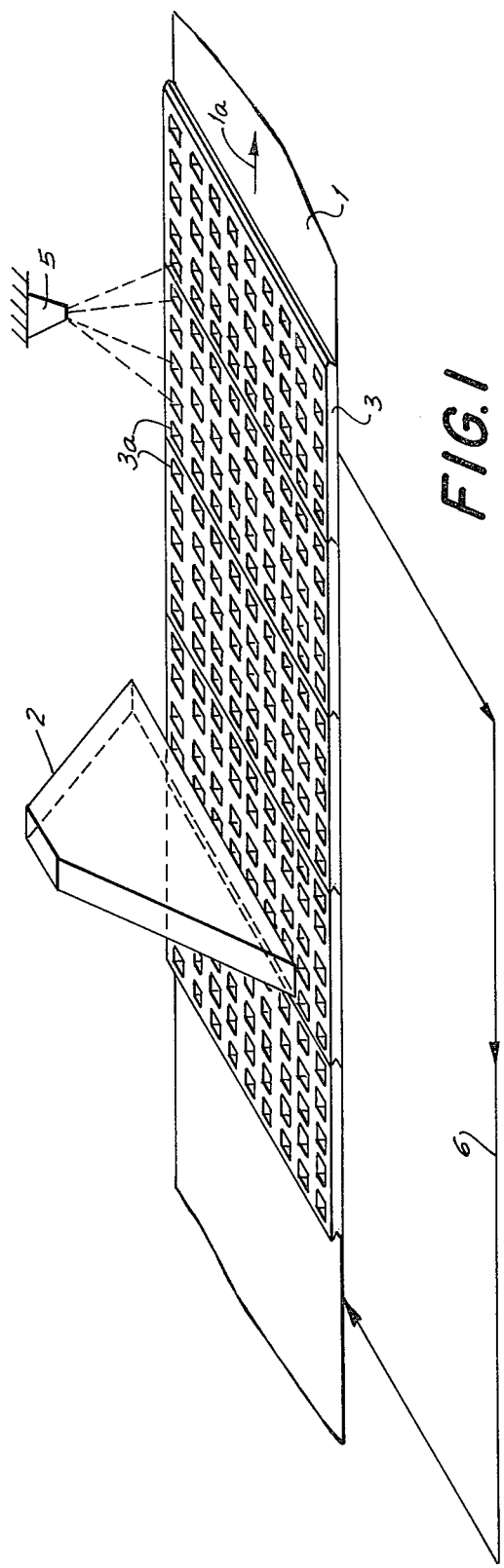
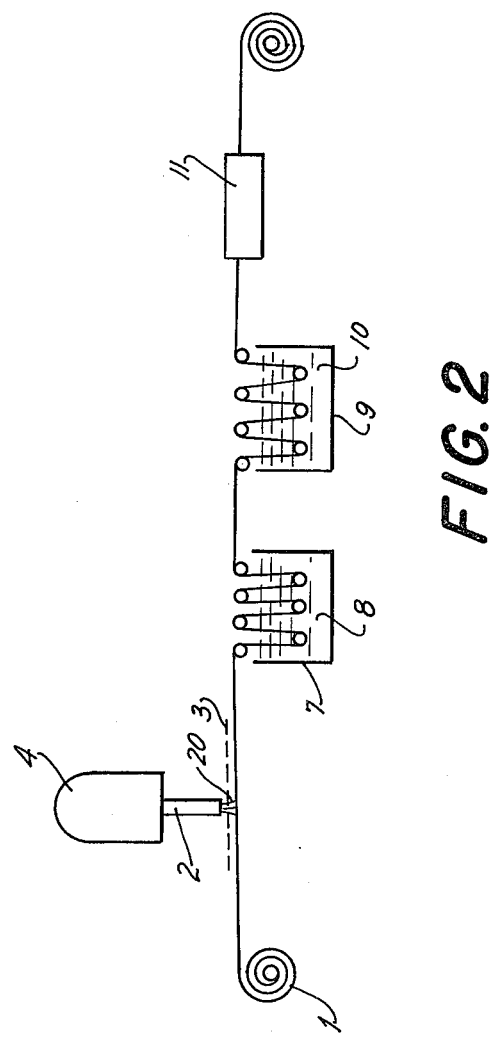

METHOD OF TREATING HIGH-POLYMER MATERIALS

CROSS-REFERENCE TO RELATED APPLICATION

This is a continuation of application Ser. No. 579,815, filed May 12, 1975 now abandoned, which in turn is a continuation of appl. Ser. No. 397,248 filed Sept. 14, 1973, now abandoned, which is a continuation-in-part of Ser. No. 76,070, filed Sept 28, 1970, now abandoned.

BACKGROUND OF THE INVENTION

The present invention relates generally to the treatment of high-polymer materials and, more particularly, to a method of affecting an exposed surface of a high-polymer material so as to impart to it a desired appearance and/or texture.

For reasons well known to those skilled in the art, the surfaces of various high-polymer materials frequently do not have or cannot be given a color effect, structural effect or textural effect which it is desired for them to have. Particularly high-polymer materials of a textile nature are, however, frequently in need of having a certain surface texture, structure of color imparted to them. Methods are known for obtaining shrink texture effects on decorative fabrics of glass fibers, in some cases even coupled with multi-coloration of the textile surface. However, these approaches require a chemical or chemical-thermal treatment of the textile materials in question and it has been found that, although they work properly with decorative textiles of glass fibers, they are not suitable for other fabrics and for other fibers.

Similarly, methods for texturing or structuring exposed surfaces of sheet materials are known which are essentially based on a mechanical-thermal deformation of the material, for instance, by the use of hot collanders, by means of profiled calender rollers, or else based upon the differential shrinking capacity of two or several different fiber components. Another approach is to subject synthetic plastic fibers and materials made from them, such as textiles or the like, to radiation which causes them to shrink to a certain extent. The shrinkage depends upon various factors, including the quantity of radiation, the type of fibrous material, and other factors. However, because textiles and similar materials so treated have a homogenous shrinkage factor, surface texturing or structuring is not attainable in this manner.

Finally, it is known to subject high-polymer materials to a combined radiation-chemical treatment, particularly to radiation-initiated grafting of vinyl compounds, which can lead to a change in the color acceptance or absorption abilities of the material. This, however, does not lead to texturing or structuring of the surfaces of materials thus treated.

SUMMARY OF THE INVENTION

It is, accordingly, an object of the present invention to avoid the aforementioned problems.

More particularly, it is an object of the present invention to provide a method of processing high-polymer materials which affords a texturing effect, a structuring effect and/or a variation in the color absorption characteristics of the material so processed.

A concomitant object is to provide such a method which is capable of providing for a permanent effect, and which does not require the use—as a base material—of a high-polymer material utilizing two or more different fiber components for obtaining a textured or structured surface effect.

A concomitant object of the invention is to provide such a method which is capable of affording the aforementioned advantages in particular, although not exclusively, in textile materials, to thereby enhance the visual and/or textile appeal of items or garments made from such materials.

In pursuance of the above objects, and others which will become apparent hereafter, one feature of the invention resides in a method of treating high-polymer materials, particularly textiles, which comprises the steps of irradiating localized areas of a high-polymer material so as to cause these areas to becom capable of reacting with a monomeric vinyl substance, and previously, simultaneously, and/or subsequently contacting the material with a monomeric vinyl substance which grafts onto the irradiated areas so as to cause the latter to shrink relative to the remainder of the material, whereby texturing of the material is obtained. To carry out the novel method, a template is superimposed upon or above the sheet material to be processed, and the template may be moved with reference to the sheet material, the sheet material may be moved with reference to the template, both may be moved simultaneously, or both may rest. The template may be provided with cutouts in a predetermined pattern or it may be composed of two or more portions which are moved with reference ot one another so as to produce variable cutouts. The exposed surface of the sheet material is subjected to radiation of high energy, preferably to electron beam radiation on the order of 300 keV or higher, through the template or through cutouts or apertures produced in or defined by the same. However, a range of 100 keV to 3 MeV for the radiation energy is suitable. Either prior to, or during and subsequently to, or prior to and during and subsequently to such treatment with radiation, the exposed surface is treated with simple media such as vinyl compounds in liquid or gaseous phase, examples being mixtures or solutions of vinly compounds in hot air, hot water or saturated steam. These media, in conjuction with the localized effects of the radiation, cause shrinkage of the material which is at a rate different from the shrinkage of the remainder of the material which has not been subjected to the radiation, and/or cause the material to have at the irradiated surface areas a color absorption factor which is different from the areas which have not been irradiated.

The template may be of aluminum or another suitable material acting as an absorber which will not permit penetration of the radiation other than at the suitable cutouts, or it may be made of such aforementioned material but not provided with cutouts and, instead, be composed of two or more sections which are movable with reference to one another and provided with apertures so as to define with their respective apertures composite cutouts of desired size and/or configuration. Such sections may be displaceable relative to one another via suitable guide rails, claims or the like. They may also be rotating perforate sections whose size, form and number of perforations, together with their speed of rotation and the speed of advancement of the web, determine the surface character which is obtained. If the sections are of the non-rotating type, the surface character of the textured or structured surface obtained in accordance with the present invention is determined either by the shape of the cutouts formed in the template or by the shape of the cutouts formed between the sections of a multi-section template.

The novel features which are considered as characteristic for the invention are set forth in particular in the appended claims. The invention itself, however, both as to its construction and its method of operation, together with additional objects and advantages thereof, will be best illustrated and understood from the following description of specific embodiments when read in connection with the accompanying drawing.

BRIEF DESCRIPTION OF THE DRAWING

The Figures are somewhat diagrammatic views illustrating different arrangements for carrying out the present invention.

FIG. 1 depicts sheet irradiation through a template;

FIG. 2 is similar view with impregnation after irradiation;

DESCRIPTION OF THE PREFERRED EMBODIMENTS

Figure 4:
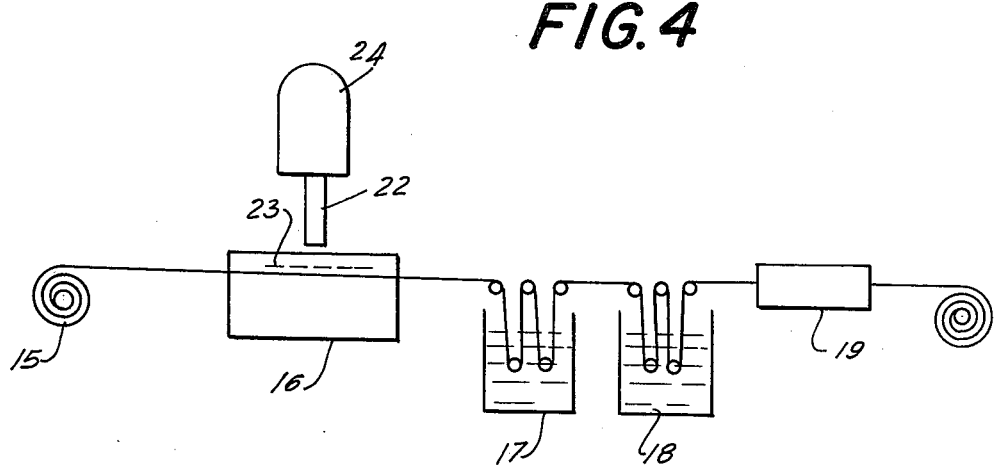
FIG. 4 is similar view of treating in a chamber while irradiating.

In order to provide some familiarization with the method of the invention before proceeding to a more in-depth discussion thereof, the invention will be initially described with reference to a specific embodiment which, however, is in no way intended to limit the invention.

Referring first to FIG. 1 of the drawing, it will be seen that reference numeral 1 identifies a web of sheet material, such as a textile of high-polymer materials, for example, in woven, non-woven or knitted form. A template 3 in the form of an aluminum plate, provided with a plurality of cutouts 3a, is arranged above the exposed surface of the web 1. Either the web 1 or the template 3, or both, can be moved with reference to one another. In the illustrated embodiment, the direction of movement of the web 1 is identified by the arrow 1a; the template 3 is in the form of several sections, all of which are provided with cutouts 3a and all of which are moved along with the web 1—on which they may rest if desired—in the same direction as the arrow 1a beneath a radiation source 2, here a scanner of an electron accelerator. Devices such as the scanner 2 of an electron accelerator are well known to those skilled in the art. Generally speaking, Van-de-Graaf generators, suitable cascade generators and similar known electron accelerators may be used, and it will suffice to indicate that radiation is directed downwardly towards the template 3 and the web 1 from the device 2. How the web 1 and the template 3 are advanced in the direction of the arrow 1a is also well known, and means for accomplishing this—for example, guide rails, claims or the like for the template, and take-up rollers for the web—are conventional and need not be discussed in detail. The template is, of course, returned—preferably in a closed loop or path—so as to again pass underneath the scanner.

The intensity of radiation is adjusted in dependence upon the material of the web 1, and reference numeral 3 identifies diagrammatically a single nozzle from which a treating medium can be sprayed or otherwise ejected onto the web 1. It is specifically emphasized that other means for supplying the treating medium may be provided instead of the nozzle 5, and that the nozzle 5 or such other means as replace it or are provided in addition to it may bring the treating medium in contact with the web 1 either prior to the passage under the scanner 2, prior to and during the passage, prior to as well as during and after the passage during and after the passage, during the passage alone, after the passage alone, or in any desired combination of sequences. Such other means include passing the web 1 through a bath of the treating medium in liquid form, through a chamber containing the treating medium in steam form, or through a tempered zone containing the medium in vapor form. In any case, the medium or media thus supplied in conjunction with the localized irradiation of the surface portions of the web 1—corresponding to the surface portions accessible to radiation through the cutouts 3a of the template 3—causes variations in the structure, texture and/or color absorption of the material of the web 1 at the irradiated surface portions as opposed to the surface portions which have not been irradiated. Thus, a permanent texturing, structuring and/or color patterning—the coloring will, of course, appear in the desired pattern only after the color is subsequently applied—is obtained according to the present invention.

The invention has the particular advantage that the texture or structure effect thus obtained is permanent and, if garments or similar articles are involved, it significantly enhances the tactile and/or visual appeal of such garments.

By selection of suitable materials and coloring agents, it is further possible to obtain a differentiated coloring, as already suggested above, so that a patterning within the color can be obtained analogous to what is otherwise achieved by printing a pattern onto a textile material.

In accordance with the invention, ornamental surface texturing or structuring is obtained by virtue of a chemical reaction which leads to localized shrinkage differences in a polymeric material when it is homogeneously treated with a suitable treating or shrinkage medium. A particular example of such a chemical reaction is radiation-chemical grafting.

Irradiation of a polymeric material causes chemically active species such as, for example, free radicals or ions, to be formed therein. The free radicals are formed, according to the invention, only in localized regions or portions of the polymeric material by directing a homogeneous beam of high-energy particles towards the polymeric material and by selectively shielding regions of the latter from the radiation so that free radicals are formed in certain regions of the polymeric material only, namely, those regions which are exposed to the radiation. Advantageously, but not necessarily, the radiation beam is an electron beam. The localized regions of a polymeric material in which the free radicals are formed are chemically active and are capable of undergoing or participating in a host of secondary reactions such as cross-linking of the polymer, degradation of the polymer, recombination reactions and grafting copolymerization or polymerization. It is reactions such as these which cause shrinkage of the polymeric material. The shrinkage resulting from these reactions is localized since the regions of the polymeric material which are able to undergo reaction are localized, and it is such localized shrinkage which produces an ornamental surface structuring or texturing. Thus, a prerequisite for the method of the invention is the presence of localized reaction-capable regions in a polymeric material as well as the presence of a treating medium such as, for instance, a monomeric vinyl substance, which is able to react at these localized regions.

It should be mentioned here that treating media may be used which are able to cause shrinkage of the unirradiated regions of a polymeric material also, i.e. which would cause shrinkage of the polymeric material even if it were not irradiated. Under such circumstances, what happens is that the degree of shrinkage in the unirradiated regions of the polymeric material is different from that in the irradiated regions thereof. It will be seen that, in general, the effects according to the invention are obtained by virtue of relative shrinkage of the unirradiated and irradiated regions of a polymeric material. In this connection, it is pointed out that relative shrinkage of two different irradiated regions of a polymeric material may be obtained when the number or quantity of the free radicals formed in the two regions is different as can be done by controlling the radiation dose applied to these regions. Examples of treating media which are capable of causing shrinkage of the irradiated, as well as the unirradiated, regions of a polymeric material are hot air, hot water and saturated steam.

It will be seen from the foregoing discussion that the treating media may effect structuring or texturing of a polymeric material in two ways. On the one hand, the treating media may cause local differences in the structure of the polymeric material due, for example, to cross-linking or decomposition reactions in the locally irradiated regions thereof, As a result of these local differences in structure, the unirradiated and irradiated regions of the polymeric material will shrink relative to each other. On the other hand, the treating media may cause relative shrinkage of the unirradiated and irradiated regions of a polymeric material by chemically reacting with the high-polymer material in the locally irradiated regions thereof; an example of treating media which may chemically react with a high-polymer material being the class of monomeric substances which may graft onto the polymeric material.

The essential point is that the treating medium or media used be capable of reacting with the irradiated regions of a polymeric material. Whether the treating medium is able to cause shrinkage of the unirradiated regions of a polymeric material also is of secondary importance.

In accordance with the invention, the polymeric material is locally irradiated and either: (1) before, or (2) during, or (3) after, or (4) before and during, or (5) before and after, or (6) during and after, or (7) before, during and after this localized irradiation, the polymeric material is treated with a medium which, in conjunction with the influence of the radiation, leads to shrinkage in the irradiated regions of the polymeric material which is different from that which may occur in the unirradiated regions of the latter. It is again emphasized that the treating medium may or may not be able to cause shrinkage of the unirradiated polymeric material but must have the ability to cause shrinkage when used in combination with the effects of the energetic radiation. For example, a 20% solution of acrylamide causes shrinkage only when the acrylamide grafts onto the irradiated regions of the polymeric material. It is pointed out here that, where treating media are used which graft onto the polymeric material, the grafting is primarily for the purpose of simultaneously causing shrinkage, which localized grafting then leads to an ornamental surface structure.

Where the polymeric material is treated with a treating medium prior to or during the irradiation, it is preferable to use a monomeric substance as a treating medium. Such substance will graft onto the locally irradiated regions of the polymeric material thereby causing localized shrinkage and a resultant relief-type effect leading to structuring or texturing of the polymeric material. The monomeric substance may be either in liquid or gaseous phase. The required radiation dose for initiating the grafting reaction is a function of the monomeric substance used as well as of the particular high-polymer constituting the polymeric material.

When treatment of the polymeric material with a treating medium is performed subsequent to irradiation, i.e. the so-called "prior irradiation technique", hot air, hot water or saturated steam, for example, may be used as the treating medium. As already mentioned, treating media of this type are capable of causing shrinkage of the unirradiated regions of a polymeric material also and, where these treating media are used, structuring or texturing effects are produced because the unirradiated regions of the polymeric material shrink to a different degree than the irradiated regions of the latter. Such treating media cause changes in the structure of the polymeric material to occur in the irradiated regions, thereof and, depending in part upon the type of polymer constituting the polymeric material, the changes in structure will be due to either cross-linking or degradation reactions. However, it is also possibe to use, for instance, a monomeric substance as the treating medium, in which case the structuring effects are a result of grafting of the monomeric substance to the polymeric material in the irradiated regions of the latter.

In a case where the treating medium is contacted with the polymeric material both before and after the irradiation, the polymeric material may be treated, prior to the irradiation, with a monomeric substance in order to obtain a grafting reaction. By then treating the polymeric material, subsequent to the irradiation, either with a treating medium of the type which is able to cause shrinkage of the unirradiated regions of the polymeric material also or with the same monomeric substance which was used prior to the irradiation or with a different monomeric substance, the effects according to the invention may be enhanced. On the other hand, the effects in accordance with the invention will likewise be obtained when, before the irradiation, the polymeric material is contacted with a substance which favors, for example, cross-linking of the former, and is then treated, after the irradiation, with a treating medium of the type capable of causing shrinkage of the unirradiated regions thereof also. Examples of substance which favor cross-linking of a polymeric material are polyfunctional monomeric substances such as divinylbenzol and triallylcyanurate.

When treatment of the polymeric material is carried out both during and after the irradiation, the treating medium used during the irradiation is advantageously either a monofunctional monomeric substance (which causes grafting) or a polyfunctional monomeric substance (which causes cross-linking). The treating medium utilized subsequent to the irradiation may be either a monomeric substance or, again, a substance capable of causing the unirradiated regions of the polymeric material to shrink also. This variation of the method of the invention, i.e. where the polymeric material is treated both during and after the irradiation, is a combination of the variations listed under (2) and (3) above.

It is pointed out that the variant of the method of the invention where the polymeric material is treated both before and during the irradiation has not been discussed in detail since it is merely a combination of the variations listed under (1) and (2) above. Similarly, that variation where the polymeric material is contacted with a treating medium before, during and after the irradiation is a combination of the others.

The sequence of steps in the method of the invention, although not necessarily critical, may be so chosen as to obtain optimum processing conditions. If, for example, the high-polymer constituting the polymeric material is of such a nature that the life of the free radicals formed by the irradiation is relatively short, then the polymeric material is advantageously contacted with the treating medium before or during the irradiation in order to insure that adequate reaction occurs. On the other hand, if the high-polymer is such that the life of the free radicals is relatively long, for instance, if the polymeric material consists of polyamide, then the treatment with the treating medium favorably follows the irradiation.

The length of time for which the polymeric material in irradiated depends basically upon two factors. The first is the amount of time it takes for the radiation dose necessary to produce a sufficient quantity of free radicals to be absorbed by the polymeric material. The second is the power output of the radiation source used. In accordance with the invention, it is particularly advantageous when the radiation source is an electron accelerator, although other radiation sources are also suitable. The greater the power output of the radiation unit, the less will be the time required for absorption of a predetermined radiation dosage. For instance, where an electron accelerator generates 1 kW and the scanning beam is substantially planar, that is, the surface of the electron beam beneath the scanner of the electron accelerator is homogeneous, the time required for a polymeric material to absorb a radiation dose of about $10^7$ rad is approximately 1 minute. This means that, in a continuous process, the polymeric material to be irradiated may be conveyed at a rate of about 30 cm/min (1 minute being the residence time in the radiation field). Where the output of the electron accelerator is 10 kW, the polymeric material to be irradiated may, then, be permitted to pass through the radiation field at a rate of 3 m/min. For still higher outputs the rate of passage of the polymeric material through the radiation field may be further increased. It will be seen that the length of time required for the irradiation process is determined by the radiation dose to be absorbed by the polymeric material and by the power output of the radiation unit.

The radiation dose to be absorbed by the polymeric material is dependent upon both the type of high-polymer constituting the latter and the intensity of the final effect which it is desired to achieve. However, the interrelationship between the radiation dose absorbed and the quantity of the treating medium which is contacted with the polymeric material (or the concentration of that substance in the treating medium which reacts with the irradiated regions of the polymeric material where the treating medium comprises a mixture or solution) must also be taken into account here. Below are listed some examples of high-polymers which may suitably be used and the corresponding of radiation doses which are advantageously utilized for them: (a) polyamide, $5.10^5 - 10^7$ rad; (b) polyester, $10^6 - 5.10^7$ rad; (c) polyolefine, $10^6 - 5.10^7$ rad; and (d) polyacrylonitrile, $5.10^5 - 10^7$ rad.

The energy of the electons in the electron beam used for the irradiation, or the energy of the particles in any other type of beam used for the irradiation, is dependent upon the thickness of the polymeric material to be irradiated. The electron energy is favorably between 100 keV and 1.5 Mev although it may be as high as 3 Mev. Polymeric materials having a mass per unit area between approximately 100 g/m$^2$ and 5000 g/m$^2$ may be irradiated using a range of electron energy from 100 KeV to 1.5 Mev.

The irradiation is advantageously carried out at room temperature, that is, at about 20° C. However, the irradiation may be performed at any temperature between about 20° C. (where the irradiated polymeric material is cooled) and 100° C. (where the irradiated polymeric material is not cooled).

The length of the time for which the polymeric material is to be contacted with the treating medium is determined by the rate at which the latter takes effect. On the other hand, the rate at which the treating medium takes effect is itself influenced by different factors, in particular, by the temperature and the concentration of the treating medium. Normally, the length of time for which the polymeric material is contacted with the treating medium lies approximately between 1 and 30 minutes.

Where the treating medium is a monomeric substance, the polymeric material is contacted with the same at a temperature between substantially 20 and 80° C. Where hot air, hot water or saturated steam are utilized as treating media, contact with the polymeric material is made at a temperature between substantially 80 and 150° C.

In general, hot media and monomeric substances in liquid or gaseous phase may find an application as treating media. More particularly, vinyl compounds may be used for this purpose and especially suitable substance are acrylamide, acrylic acid, styrene, acrylonitrile, itaconic acid, divinylbenzol, triallylcyanurate, polyfunctional monomeric substance, hot air, hot water and saturated steam.

When an irradiated polymeric material is brought into contact with a suitable treating medium, the prerequisites for shrinkage of the polymeric material come into existence. However, it may sometimes be desirable to prevent shrinkage for some period of time, perhaps even for several days. This might be the case when the polymeric material is to undergo a subsequent processing step such as, for instance, a coloring operation. Under such circumstances, the polymeric material may be subjected to a tension when it is contacted with the treating medium, as a result of which shrinkage is prevented although the conditions for latent shrinkage of the polymeric material exist. When the polymeric material is then further processed subsequently (in a coloring bath, for example) and the tension is released, the polymeric material will undergo shrinkage at this time due to the elevated temperature of the coloring bath.

It is pointed out here that the thickness of the polymeric material should be taken into account in both the irradiating step and the step of contacting the polymeric material with the treating medium. Thus, for the same radiation output of the radiation source, an increase in the thickness of the polymeric material does not require that the rate of passage thereof through the radiation field be changed if the energy of the particles in the radiation beam is adjusted in accordance with the thickness of the polymeric material to be irradiated. On the other hand, the length of the time for which the polymeric material is to be contacted with the treating medium is influenced by the thickness of the former insofar as longer contact times are required for the treating medium to permeate or penetrate the polymeric material as the thickness of the latter increases.

In some instances, it may be desirable to wash the polymeric material such as, for example, when residual treating medium is to be removed therefrom. The washing processes conventionally used in the textile industry may be used here also and the length of time for which the polymeric material is to be washed in so-called wide washing machines or so-called narrow or rope washing machines, for example, and the washing process is carried out at a temperature between substantially 40 and 80° C.

Subsequent to washing of the polymeric material, the latter may be dried. Any dryers conventionally used in the textile industry may be used for this purpose, particularly hot-air dryers. The drying temperature and the length of time required for drying the polymeric material are both dependent upon the thickness of the latter, a thin fabric requiring less time to dry than a thick fabric.

Generally, all natural and synthetic high polymers may be processed in accordance with the method of the invention. In particular, polyamides, polyesters, polyolefines, cellulose and polyacrylonitrile may be so processed. Specific but non-limiting examples of some of the above materials are polyamide-6, polyamide-6.6, polyethyleneterphthalate, polyethylene, polypropylene, PAN-homopolymer and PAN-copolymer (PAN being an abbreviation for polyacrylonitrile).

Where the treating medium is a monomeric substance and grafting occurs, permanent changes in the properties of the polymeric material may be produced. For example, the coloring and dyeing characteristics may be improved as may be the water absorption and dirt-repellant characteristics of the polymeric material.

Of course, any desired texturing or structuring and/or coloring effect can be obtained by means of a variable movement control for a template which is used in accordance with the present invention. Following are some examples which are to be considered as strictly explanatory and which are not to be considered limiting in any sense. They are based on the processing of a web with an arrangement such as shown in FIG. 1 where the template moves with the web and is of the type provided with the illustrated cutouts.

EXAMPLE 1

Polyamide fabric is exposed in the radiation field of an electron beam accelerator, with an aluminum template 3 provided with cutouts 3a and having a thickness of approximately 1.5 mm being interposed between the exposed surface of the polyamide web 1 and the scanner 2 of the electron beam accelerator. The ambient fluid is air and the dosage of radiation applied is $10^7$ rad at an electron energy of 1 MeV. After irradiation, the fabric is brought for a period of 30 minutes into contact with a 20% aqueous acrylamide solution at a temperature of 25° C. A grafting of acrylamide takes place at the irradiated surface portions, and as a result of the simultaneously occurring localized shrinkage one obtains a surface structured material which, in addition, has a higher moisture absorption capability than the initial material prior to the treatment. Thus, while in particular the air permeability of the resulting material remains largely unchanged, the material is particularly improved for use in making garments, not only from an aesthetic point of view but also because of its higher moisture absorption factor.

EXAMPLE 2

A thread-textured polyester textile is subjected to irradiation by an electron beam accelerator, with an aluminum template 3 of approximately 1.5 mm thickness being interposed between the exposed surface of the web 1 and the radiation source, the template 3 being provided with cutouts 3a in a desired pattern. The ambient fluid is air and the dosage of radiation is $3 \cdot 10^7$ rad at an electron energy of 1 MeV. Subsequent to irradiation, the web 1 was treated for 60 minutes in a 20% aqueous acrylic acid solution at 100° C. The material was then thoroughly rinsed and colored. It was found that the irradiated surface portions have a higher color absorption factor than the non-irradiated surface portions so that the fabric on being colored or dyed receives a colored pattern corresponding to the pattern in which the cutouts were arranged on the template.

EXAMPLE 3

Polyamide fabric of a width of 2 meters was passed under the scanner 2 of an electron beam accelerator with a speed of 4 meters per minute. The template was in form of aluminum plates, such as those identified with reference numeral 3 in FIG. 1, provided with cutouts 3a and moving at the same speed and in the same direction as the polyamide web 1. The radiation energy was 20 mA and the electron energy was 500 keV. After irradiation, the fabric was treated for 30 minutes at 25° C. in a 20% aqueous acrylamide solution and was found to have the characteristics outlined with reference to Example 1.

The following are additional examples further illustrating the invention and which, again, are to be considered as purely exemplary and not limiting the invention in any manner.

EXAMPLE 4

A web 1 (FIGS. 1 and 2 of woven polyamide fabric having a width of 1.8 m and a mass per unit area of 100 g/m² is unwound from a suitable uncoiling arrangement. The web 1 is passed into the radiation field 20 of an electron accelerator 4 of the Van-de-Graaf type. The power output of the electron accelerator 4 is 10 kW and the electron energy is 400 keV. In the radiation zone, that is, beneath the scanner 2 of the electron accelerator 4, the web 1 is locally or selectively shielded from the radiation by means of a template 3 provided with cutouts 3a. As a result, the web 1 is locally irradiated. The template 3, which is in the form of several sections and which travels with the web 1 in the direction of the arrow 1a, is returned via a suitable template-conveying arrangement 6 so that it may again pass underneath the scanner 2 of the electron accelerator 4. The template 3 is composed of aluminum and has a thickness of 1.5 mm. The rate of passage of the web 1 through the radiation field is so chosen that the irradiated regions thereof absorb a radiation dose of $10^7$ rad. Immediately after the irradiation, the web 1 is treated in a conventional roller equipped tank 7 containing an aqueous 20% acrylamide solution 8. The temperature of the solution 8 is 25° C. and the treatment lasts for 10 minutes. As a result of this treatment, monomeric acrylamide grafts onto the irradiated regions of the web 1. Due to the localized shrinkage resulting from and accompanying the grafting, a surface structured material is obtained. This material is patterned and exhibits a greater moisture absorption capability than the starting material. Since the air permeability of the patterned material is substantially unchanged from that of the starting material, the physiological properties of the material, particularly as they pertain to clothes, are improved because of the greater moisture absorption capability of the treated material. In order to remove residual monomeric substance, the patterned web 1 is washed in a washing machine 9 of conventional construction containing a washing liquid 10 heated to 60° C. Subsequently, the web 1 is dried with a conventional dryer 11 such as, for example, a screen drum dryer, and then coiled.

EXAMPLE 5

Figure 3:
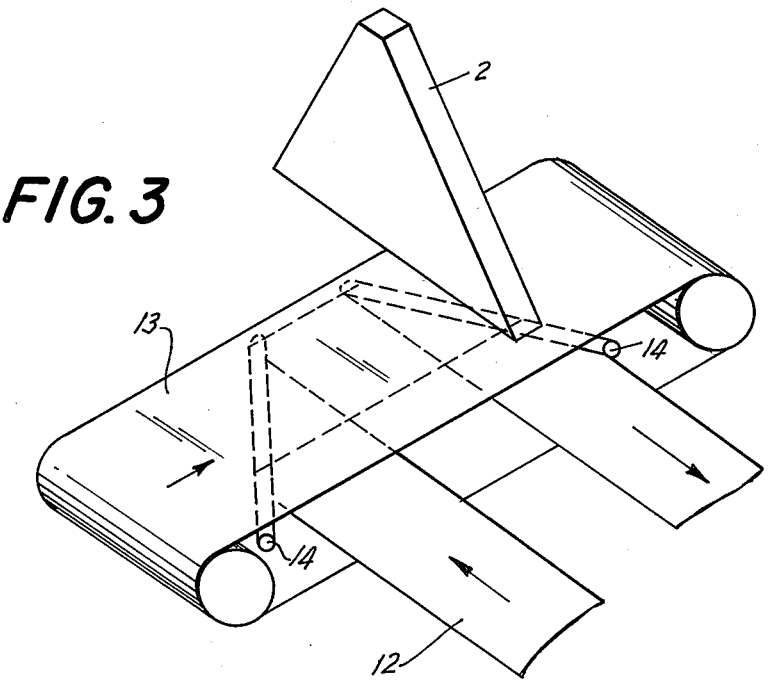
FIG. 3 depicts irradiation through an endless band.

A web 12 (FIG. 3) of a polyester knit fabric having a width of 1.20 m and a mass per unit area of 250 g/m² is conveyed beneath the scanner 2 of an electron accelerator together with an endless, moving band 13. The band 13 is provided with cut-outs corresponding to the desired pattern to be obtained on the web 12 and the motion of the band 13 is synchronized with that of the web 12. The electron accelerator is of the ICT tyep (insulating core transformer type). The passage of the web 12 underneath the upper run of the band 13 is effected by means of reversing rollers 14 arranged between the upper and lower runs of the band 13. The rollers 14 are positioned diametrically opposite each other and are offset with reference to one another by 45°. The processing of the web 12 subsequent to the irradiation is performed in the same manner as in Example 4 with the exception that the treating medium here is a 25% aqueous solution of acrylic acid and that the treatment with the latter is carried out at boiling temperature. As a result, a patterned, knit polyester fabric is obtained, the pattern corresponding to the cut-outs in the band 13. In addition to the patterning of the fabric, the irradiated and grafted regions of the latter exhibit a greater color absorption capability than the non-irradiated regions, whereby it is possible to obtain color patterning.

EXAMPLE 6

A web 1 (FIGS. 1 and 2) of woven polyamide fabric having a width of 1.8 m and a mass per unit area of 100 g/m² is unreeled from a suitable unwinding arrangement. In contrast to Example 4, however, the web 1 is first conveyed into the roller equipped tank 7 containing an aqueous 20% acrylamide solution 8. The solution 8 is at a temperature of 25° C. and the web 1 is treated therein for 10 minutes. The thus-treated web 1 is then passed into the radiation field 20 of a Van-de-Graaf electron accelerator 4 operating at a power output of 10 kW, the electron energy being equal to 400 keV. In the radiation field or zone 20 or, in other words, beneath the scanner 2 of the electron accelerator 4, the web 1 is selectively shielded by means of a template 3 having out-outs 3a. As a result, localized irradiation of the web 1 occurs. The template 3, which is composed of several sections, travels with the web 1 in the direction of the arrow 1a and is returned by means of a suitable template-conveying arrangement 6 so as to again pass beneath the scanner 2 of the electron accumulator 4. The template 3 is composed of aluminum having a thickness of 1.5 mm. The rate of passage of the web 1 through the radiation field 20 is so selected that a radiation dose of 10⁷ rad is absorbed in the irradiated regions thereof.

Due to this treatment, grafting of the monomeric acrylamide occurs in the irradiated regions of the web 1 and because of the localized shrinkage which accompanies the grafting, a surface textured material is obtained. This material is, therefore, patterned and exhibits a higher moisture absorption capability than the starting material. In particular, the physiological properties of the material, as they pertain to garments, are improved because of the higher moisture absorption capability since the air permeability of the material remains substantially unchanged during the processing. The patterned material is washed in the washing machine 9 which contains a washing liquid 10 at a temperature of 60° C. for the purpose of removing residual monomers. Subsequently, the web 1 is dried in the dryer 11 which may, for instance, be a screen-drum dryer, and the web 1 is then coiled.

EXAMPLE 7

A web 12 (FIG. 3) of a knit polyester fabric having a width of 1.20 m and a mass per unit area of 250 g/m² is first treated in a roller equipped tank, such as the tank 7 in FIG. 2, containing an aqueous 25% acrylic acid solution at boiling temperature. (Compare with Example 5). The thus-treated web 12 is next conveyed beneath the scanner 2 of an ICT (insulating core transformer) type electron accelerator together with a moving, endless band 13. The band 13 has cut-outs corresponding to the desired pattern to be obtained in the web 12 and the motion of the band 13 is synchronized with that of the web 12. Passage of the web 12 beneath the upper run of the band 13 is effected via reversing rollers 14 positioned diametrically opposite each other and offset relative to one another by 45°, the rollers 14 being arranged between the upper and lower runs of the band 13. The remaining processing of the web 12 is accomplished as in Example 6. As a result, a knit polyester fabric is obtained having a pattern corresponding to the cut-outs in the band 13. In addition to the patterning, the irradiated and grafted regions of the web 12 exhibit a greater color absorption capability than the non-irradiated regions thereof so that it becomes possible to obtain color patterning.

EXAMPLE 8

A web 1 (FIGS. 1 and 2) of woven polyamide fabric having a width of 1.8 m and a mass per unit area of 100 g/m² is unwound from a suitable unwinding arrangement. The web 1 is then conveyed into the roller equipped tank 7 containing an aqueous 20% acrylamide solution 8. The temperature of the solution 8 is 25° C. and the web 1 is treated therein for 10 minutes. The web 1 is next passed into the radiation field 20 of a Van-de-Graaf type electron accelerator 4 which operates at a power output of 10 kW, the electron energy being equal to 400 keV. In the radiation field or zone 20, that is, beneath the scanner 2 of the electron accelerator 4, the web 1 is selectively or locally covered with a template 3 provided with cut-outs 3a. Consequently, a selective or localized irradiation of the web 1 occurs. The template 3, which is composed of several sections, travels with the web 1 in the direction of the arrow 1a and a suitable template-conveying arrangement 6 returns the sections of the template 3 to their starting point after they have passed through the radiation field 20 of the electron accelerator 4. The template 3 consists of aluminum and has a thickness of 1.5 mm. The rate of passage of the web 1 through the radiation field 20 is selected in such a manner that the irradiated regions thereof absorb a radiation dose of $10^7$ rad. This treatment causes grafting of monomeric acrylamide in the irradiated regions of the web 1 and the localized shrinkage arising as a result of the grafting produces a surface textured material. Immediately following the irradiation, the web 1 is passed into a roller equipped tank such as at 7 containing an aqueous 20% acrylamide solution such as 8, the latter being at a temperature of 25° C. and the web 1 being treated therein for 10 minutes. Due to this second treatment of the web 1 in a monomeric solution (compare with Examples 4 and 6), the structuring effect or the patterning is enhanced and a patterned material is obtained.

EXAMPLE 9

A web 12 (FIG. 3) of knit polyester fabric having a width of 1.20 m and a mass per unit area of 250 g/m² is passed into a roller equipped tank such as 7 in FIG. 2 which contains an aqueous 25% solution of acrylic acid at boiling temperature. The thus-treated web 12 is conveyed beneath the scanner 2 of an electron accelerator of the ICT (insulating core transformer) type together with a band 13 having cut-outs in accordance with the pattern which it is desired to obtain in the web 12. The moving, endless band 13 and the web 12 are conveyed synchronously. The web 12 is passed beneath the upper run of the band 13 by means of diametrically oppositely positioned reversing rollers 14 rotated with reference to each other by 45° and arranged between the upper and lower runs of the band 13. Immediately after the irradiation, the web 12 is passed into a roller equipped tank such as 7 in FIG. 2 containing an aqueous 25% acrylic acid solution at boiling temperature. This second treatment of the web 12 in a monomeric solution (compare Examples 5 and 7) leads to an enhancement of the patterning or structuring effect.

EXAMPLE 10

A web 15 (FIG. 4) of non-woven fabric composed of meshed polyacrylonitrile fibers and having a width of 1.10 m and a mass per unit area of 400 g/m² is unreeled from a suitable unwinding arrangement. The web 15 is then conveyed into a chamber 16 heated to 70° C. The chamber 16 is provided with a thin, electron permeable window which may, for instance, be a 40 micron thick titanium foil. The chamber 16 is irradiated with high-energy particles having an energy of 700 keV. The irradiation is performed with a suitable radiation source 24 having a scanner 22, and the effects of the irradiation are restricted to selected regions of the web 15 by means of the template 23. In order to exclude oxygen, the interior of the chamber 16 is filled with a pure, saturated styrene vapor which grafts onto the irradiated regions of the web 15 during the irradiation. After the web 15 exits from the chamber 16, it passes into a roller equipped tank 17 containing a liquid mixture of monomeric styrene and methanol (proportions; 50:50 by weight) at a temperature of 40° C. In order to displace oxygen therefrom, the tank 17 is flushed with nitrogen. A further grafting occurs here, as a result of which the grafting effect and, hence, the shrinkage effect is enhanced. The styrene which has not grafted or reacted is then washed out from the web 15 with methanol at a temperature of 30° C., this taking place in another roller equipped tank 18 of known construction. Finally, the methanol is evaporated in an evaporation zone 19. The final product is a patterned, structured non-woven fabric of polyacrylonitrile.

EXAMPLE 11

A web 1 (FIGS. 1 and 2) of woven polyamide fabric having a width of 1.80 m and a mass per unit area of 100 g/m² is locally irradiated as in Example 4. The radiation dose absorbed at the irradiated regions of the web 1 amounts to $10^8$ rad. During the irradiation, the oxygen in the surrounding atmosphere is driven off by flushing with an inert gas such as nitrogen, for example. The irradiated regions of the web 1 undergo crosslinking at the selected radiation dose. Subsequent to the irradiation, the locally irradiated and locally cross-linked polyamide web 1 is treated with satuarated steam. Due to this treatment with saturated steam, the cross-linked regions of the web 1 shrink to a different degree than the non-irradiated regions of the latter. Thus, a structuring effect or patterning is obtained during the saturated steam treatment which corresponds to the pattern selected for the template.

EXAMPLE 12

A polyester knit fabric is irradiated in accordance with Example 10, that is, the localized irradiaton is performed in a closed system and hot vapor is injected into the latter. The cooperating influences of the irradiation and the hot vapor cause the irradiated regions of the fabric to shrink by a different amount than the non-irradiated regions thereof. This leads to a relief-type effect or structuring of the polyester fabric, the hot vapor may be contacted with the fabric before and after the irradiation also.

EXAMPLE 13

A biaxially stretched polyethylene foil having a thickness of 50 microns is locally irradiated as in Example 4 beneath the scanner of an electron accelerator using an aluminum template provided with cut-outs. The electron energy is equal to 300 keV and the radiation does absorbed at the irradiated regions is $3.10^7$ rad. After the localized irradiation, the foil is treated in an aqueous 20% solution of monomeric acrylic acid at a temperature of 20° C. for 20 minutes. The grafting of the acrylic acid at the irradiated regions causes the latter to shrink by an amount different from that at the non-irradiated regions whereby a relief-type effect or structuring of the foil is obtained which latter, by coloring or dyeing, may additionally be color patterned.

EXAMPLE 14

A biaxially stretched polypropylene foil having a thickness of 40 microns is irradiated as in Example 13 and, subsequent to the localized irradiation, is passed into a hot air chamber. The irradiated regions of the foil shrink to a degree which differs from that of the non-irradiated regions thereof. The result is a relief-type effect or structuring of the foil.

EXAMPLE 15

A biaxially stretched polyethylene foil is locally irradiated as in Example 13 and is then grafted, while under tension, in a 20% acrylic acid solution at 60° C. The grafted foil is rinsed so as to remove residual monomers and is subsequently colored or dyed, without tension, in a dyeing bath containing an acidic dye. The dyeing bath, which is at a temperature of 100° C., serves simultaneously as a shrinkage medium (treating medium). The result is a relief-type effect or structuring of the foil which latter is colored in the grafted regions thereof.

The structuring or texturing effects in accordance with the invention are obtainable without requiring prestretching or orientation of the polymeric material although such orientation may be performed if desired. It is also pointed out that the irradiation itself may produce structural changes in the polymeric material, i.e. changes in the structure thereof, which structural changes are effective for causing the structuring effects. It should be further mentioned that the radiation dose required for causing cross-linking is normally greater than that necessary to initiate grafting.

It will be appreciated that with the present invention, materials, particularly textile materials of high-polymer substances, can be processed to impart to them characteristics and appearances which were heretofore incapable of being achieved.

It will be understood that each of the elements described above, or two or more together, may also find a useful application in other types of applications differing from the types described above.

While the invention has been illustrated and described as embodied in a method of processing high-polymer materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should be and are intended to be comprehended within the meaning and range of equivalence of the following claims.

What is claimed as new and desired to be protected by Letters Patent is set forth in the appended claims.

The conventional heating of a high polymer does not cause the formation of free radicals in the high polymer. By "irradiation" there will be understood an irradiation using rays being able to form free radicals. The formation of free radicals is essential to the reactions of cross linking, degradation and grafting of the high polymer. All said reactions occur due to effects of the irradiation alone, i.e., they occur, when the high polymer has been irradiated, but not has been contacted with a shrinkage medium.

We claim:

1. A method of imparting a textured structure to a textile comprising the steps of subjecting to irradiation a textile which is composed of a high-polymer material of a type that can be activated by irradiation, the said irradiation being directed against selected horizontally spaced regions, and contacting the material with a polymerizable monomeric vinyl treating medium, thereby causing grafting of said treating medium upon the high-polymer material in said irradiated regions, resulting in shrinkage or increased shrinkage of the irradiated regions relative to the non-irradiated regions, the size of the individual irradiated and non-irradiated regions being large enough to cause a different ornamental effect of the two types of regions, thus resulting in a texturing effect in the textile by alternating high and low profile areas.

2. The method of claim 1 wherein the treating medium is applied to the textile prior to, simultaneously with or subsequent to said irradiation.

3. The method of claim 1 wherein said irradiation causes said activation of the high-polymer material by formation of free radical groups in said high-polymer material.

4. A method as defined in claim 1, wherein said irradiation is effected by electron beam radiation.

5. A method as defined in claim 1, wherein the electrons in the beam have an energy between substantially 100 keV and 3 Mev.

6. A method as defined in claim 1, wherein said irradiation is effected by laser radiation.

7. A method as defined in claim 1, wherein the laser rays have an quantum energy above 35 eV and a wave length below 0.36 μm.

* * * * *